(12) United States Patent
Xu et al.

(10) Patent No.: US 11,198,811 B2
(45) Date of Patent: Dec. 14, 2021

(54) MULTIFUNCTIONAL FRICTION REDUCERS

(71) Applicant: MULTI-CHEM GROUP, LLC, San Angelo, TX (US)

(72) Inventors: Liang Xin Xu, The Woodlands, TX (US); James Ogle, Livingston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 406 days.

(21) Appl. No.: 16/322,210

(22) PCT Filed: Mar. 13, 2018

(86) PCT No.: PCT/US2018/022179
§ 371 (c)(1),
(2) Date: Jan. 31, 2019

(87) PCT Pub. No.: WO2019/177594
PCT Pub. Date: Sep. 19, 2019

(65) Prior Publication Data
US 2021/0155846 A1    May 27, 2021

(51) Int. Cl.
| | | |
|---|---|---|
| *C09K 8/68* | (2006.01) | |
| *C09K 8/88* | (2006.01) | |
| *E21B 43/22* | (2006.01) | |
| *E21B 21/14* | (2006.01) | |
| *E21B 43/26* | (2006.01) | |

(52) U.S. Cl.
CPC ............... *C09K 8/68* (2013.01); *C09K 8/882* (2013.01); *C09K 8/885* (2013.01); *C09K 2208/12* (2013.01); *C09K 2208/28* (2013.01)

(58) Field of Classification Search
CPC ...... C09K 8/608; C09K 8/68; C09K 2208/12; C09K 8/528; C09K 2208/28; C09K 8/145; C09K 8/24; E21B 37/06; E21B 43/26; E21B 21/003
See application file for complete search history.

(56) References Cited

U.S. PATENT DOCUMENTS 4,693,639 A * 9/1987 Hollenbeak ............ C09K 8/145
405/263
7,232,793 B1 6/2007 King et al.
(Continued)

FOREIGN PATENT DOCUMENTS

WO    WO 2017/069762 A1    4/2017

OTHER PUBLICATIONS

Liang Xu, et al.; SPE-184508-MS; Case Study: A Two-Part Salt-Tolerant Friction Reducer System Enables the Reuse of Produced Water in Hydraulic Fracturing; 2017; Society of Petroleum Engineers, SPE International Conference on Oilfield Chemistry, Montgomery, Texas, USA, Apr. 3-5, 2017 (8pgs).
(Continued)

*Primary Examiner* — Zakiya W Bates
(74) *Attorney, Agent, or Firm* — Haynes and Boone. LLP

(57) ABSTRACT

Methods of treating a subterranean formation are described. The methods include introducing a treatment fluid that includes a friction reducing polymer (e.g., a cationic friction reducing polymer) into the subterranean formation. The cationic friction reducing polymer is allowed to degrade and release choline chloride or polyDADMAC, which can each act as a clay stabilizer.

8 Claims, 7 Drawing Sheets

(56) References Cited

U.S. PATENT DOCUMENTS

| | | |
|---|---|---|
| 2007/0173414 A1 | 7/2007 | Wilson, Jr. |
| 2010/0044048 A1* | 2/2010 | Leshchyshyn ........... C09K 8/88 |
| | | 166/308.1 |
| 2012/0067585 A1 | 3/2012 | Murphy et al. |
| 2014/0050808 A1 | 2/2014 | Sigurjonsson et al. |

OTHER PUBLICATIONS

International Search Report and Written Opinion issued by the Korean Intellectual Property Office for International Application No. PCT/US2018/022179; dated Dec. 13, 2018; (10 pgs.).

Xiong, Boya et al., Chemical Degradation of Polyacrylamide during Hydraulic Fracturing, Environmental Science & Technology, 2018, pp. 327-336, vol. 52, American Chemical Society.

\* cited by examiner

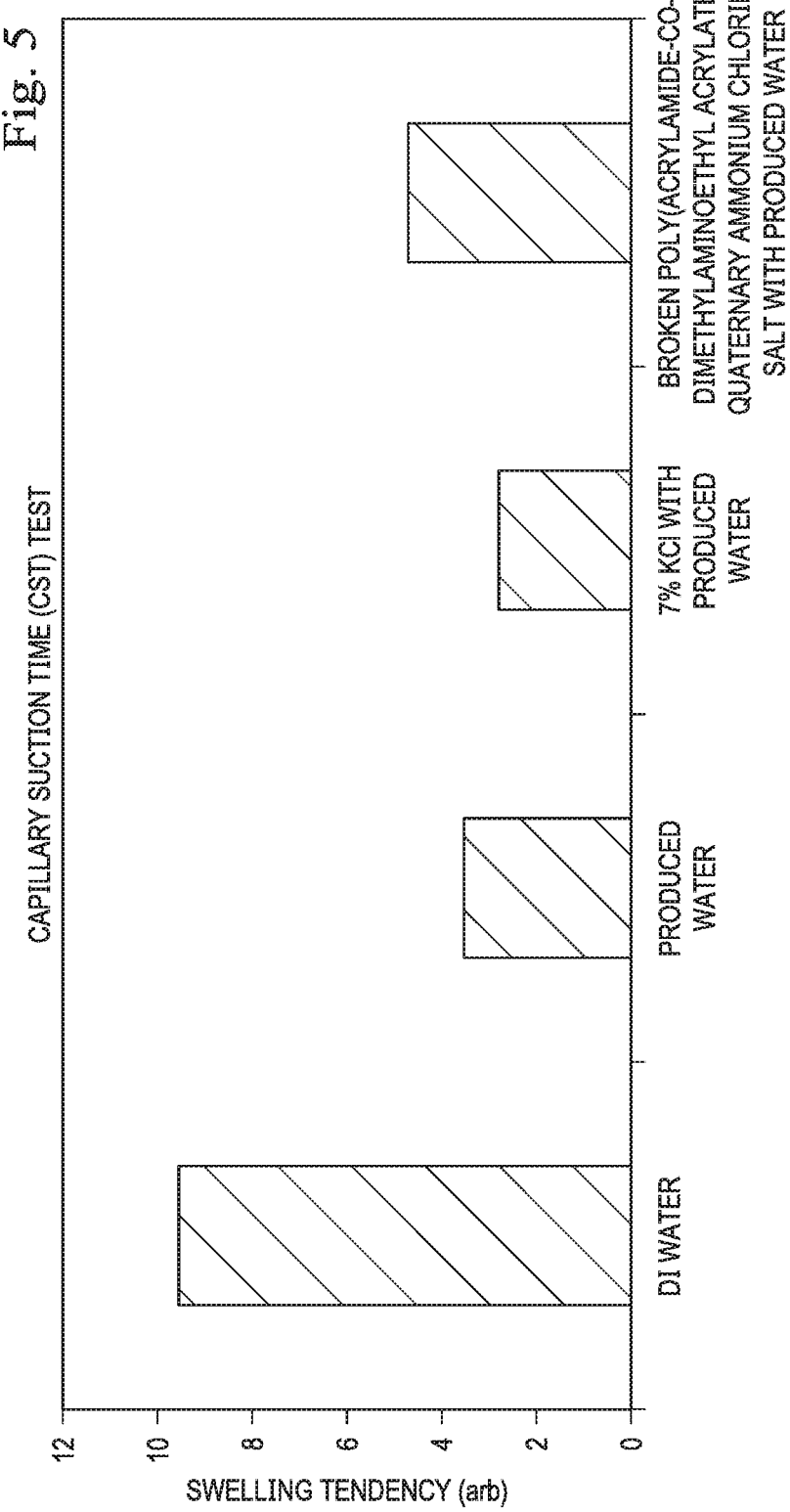

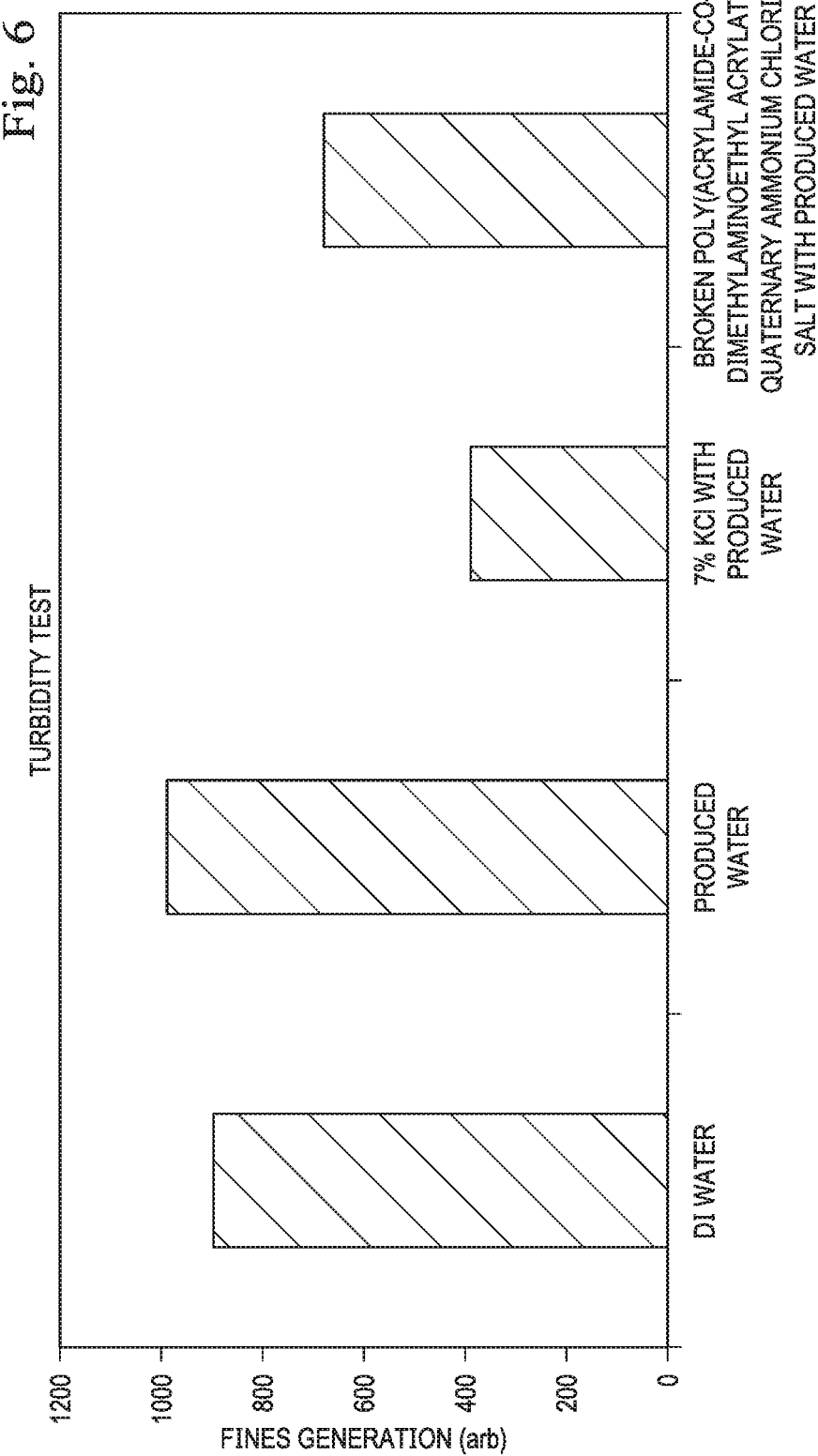

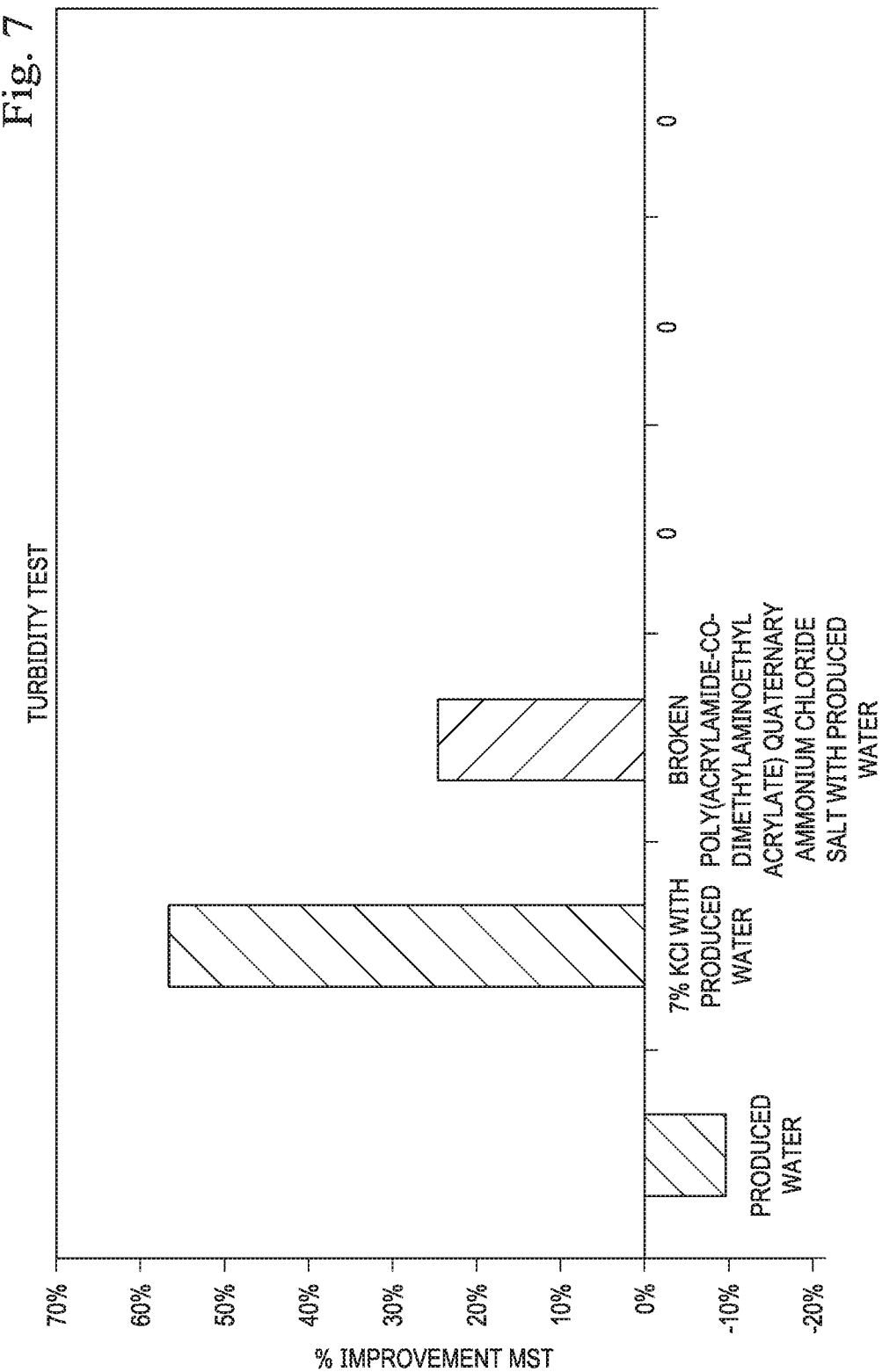

MULTIFUNCTIONAL FRICTION REDUCERS

CROSS-REFERENCE TO RELATED APPLICATION

The present application is a U.S. National Stage patent application of International Patent Application No. PCT/US2018/022179, filed on Mar. 13, 2018, the benefit of which is claimed and the disclosure of which is incorporated herein by reference in its entirety.

BACKGROUND

The present disclosure relates generally to methods for treating subterranean formations. In particular, the present disclosure relates to methods of fracturing subterranean formations using a multifunctional friction reducer that reduces friction and stabilizes clay or acts as a surfactant, a scale inhibitor, a paraffin inhibitor, an asphaltene inhibitor, or any combination thereof.

During the placement of aqueous treatment fluids into a wellbore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers are typically included in aqueous treatment fluids. These friction reducing polymers may be synthetic polymers, natural polymers, or viscoelastic surfactants and are thought to reduce the friction between the aqueous treatment fluid in turbulent flow and the tubular goods and/or the formation.

An example of a subterranean treatment utilizing an aqueous treatment fluid is hydraulic fracturing. Hydraulic fracturing is a process commonly used to increase the flow of desirable fluids, such as oil and gas, from a portion of a subterranean formation. In hydraulic fracturing, a fracturing fluid is introduced into the subterranean formation at or above a pressure sufficient to create or enhance one or more fractures therein. To reduce frictional energy losses between the fracturing fluid and/or the formation, friction reducing polymers or friction reducers may be included in the fracturing fluid.

Friction reducing polymers help reduce pipe friction, thereby allowing high pumping rates while reducing surface treating pressure. Cationic friction reducers are typically preferred over anionic friction reducers because cationic friction reducers are extremely salt tolerant and allow up to 100% re-use of produced water on location, with total dissolved solids (TDS) as high as 300,000 ppm. Cationic friction reducers, however, are considered incompatible with formation rocks such as sandstone, which is negatively charged under normal pH. Treatment of sandstone with a cationic friction reducer can potentially alter the wettability of sandstone from water wet to oil wet, which is undesirable.

Thus, there is a continuing need for improved methods and compositions for treating subterranean formations with friction reducers.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

FIG. 5 illustrates the results of a capillary suction time test according to one or more embodiments;

FIG. 6 illustrates the results of a turbidity test according to one or more embodiments; and FIG. 7 illustrates the percent improvement in the turbidity test according to one or more embodiments.

DETAILED DESCRIPTION

Figure 1:
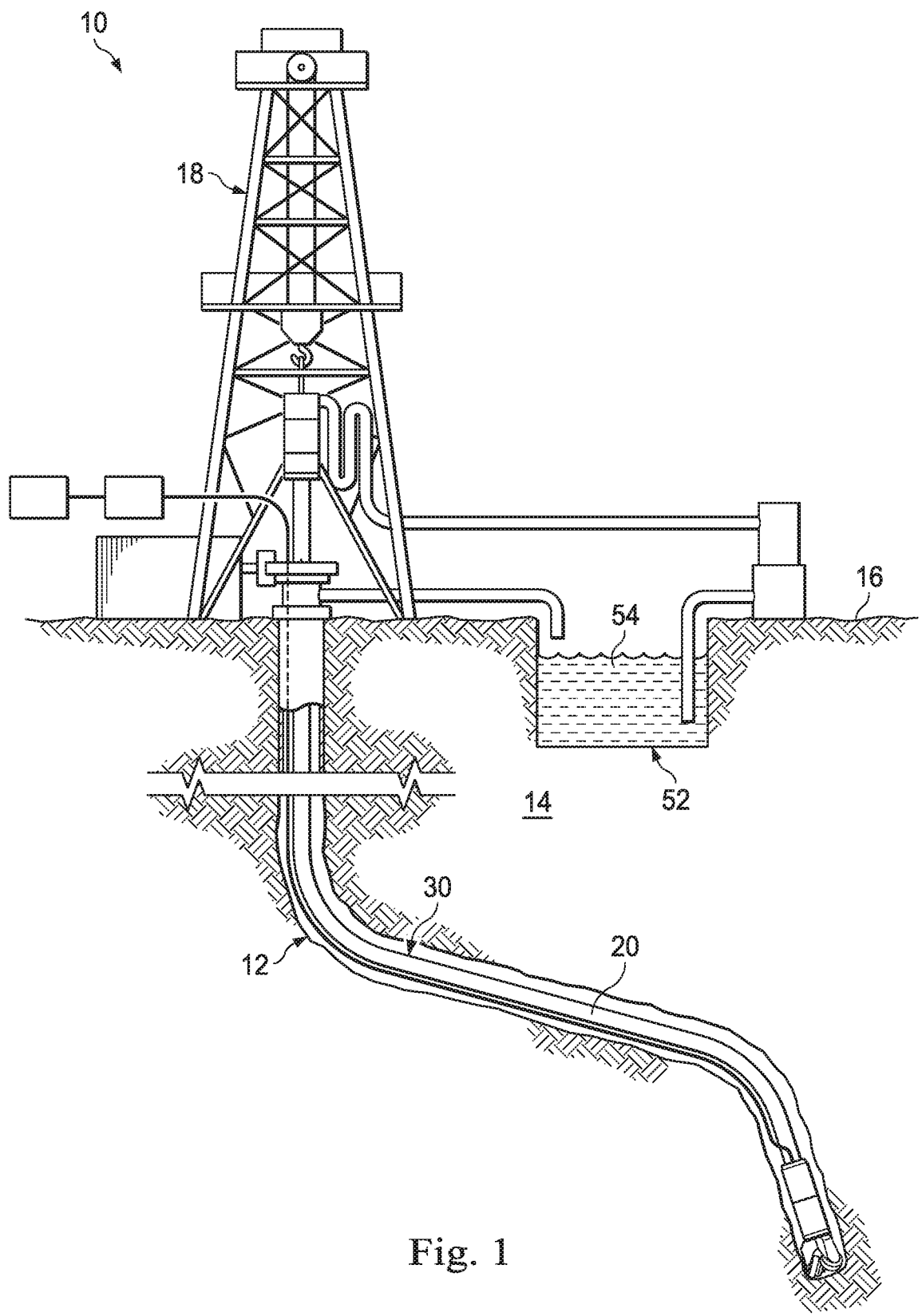
FIG. 1 illustrates a land-based drilling and production system.

Methods are provided for treating subterranean formations using a friction reducer (e.g., a cationic friction reducer or an anionic friction reducer). Such treatment operations can include, for example, drilling operations, stimulation operations, production operations, remediation operations, sand control treatments, and the like. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, acidizing operations, scale dissolution and removal operations, sand control operations, consolidation operations, anti-sludge operations, and the like. The term "friction reducing polymer" or "friction reducer," as used herein, refers to a polymer that reduces frictional losses due to friction between an aqueous fluid in turbulent flow and tubular goods (e.g. pipes, coiled tubing, etc.) and/or the formation.

In one or more embodiments, the friction reducers described herein may be included in any suitable treatment fluid. As used herein, a "treatment fluid" refers to a fluid used to drill, complete, work over, fracture, repair, or in any way prepare a wellbore for the recovery of materials residing in a subterranean formation penetrated by the wellbore. Examples of treatment fluids include, but are not limited to, cement slurries, drilling fluids or muds, spacer fluids, and fracturing fluids or completion fluids. It is to be understood that "subterranean formation" encompasses both areas below exposed earth and areas below earth covered by water such as ocean or fresh water.

In one or more embodiments, a treatment fluid that includes a cationic friction reducer is provided. In one or more embodiments, the cationic friction reducer includes a polymer having releasable choline groups or releasable poly(diallyldimethylammonium chloride) (polyDADMAC) groups in the polymer backbone.

In one or more embodiments, the cationic friction reducer includes a block copolymer of diallyldimethylammonium chloride (DADMAC). For example, a block copolymer of DADMAC may include poly(DADMAC-co-acrylamide).

In one or more embodiments, the cationic friction reducer includes a poly(acrylamide-co-dimethylaminoethyl acrylate) quaternary ammonium chloride salt, which releases choline chloride on hydrolysis.

In one or more embodiments, the cationic friction reducer includes at least one cationic monomer. As used herein, "cationic monomer" means a monomer that possesses a positive charge. A suitable cationic monomer includes DADMAC. Examples of other suitable cationic monomers include (trimethylamino)ethyl acrylates and methacrylates and their quaternary or acid salts, such as (trimethylamino)ethyl acrylate methyl chloride quaternary salt, (trimethylamino)ethyl acrylate methyl sulfate quaternary salt, (trimethylamino)ethyl acrylate benzyl chloride quaternary salt, (trimethylamino)ethyl acrylate sulfuric acid salt, (trimethylamino)ethyl acrylate hydrochloric acid salt, (triethylamino)ethyl acrylate methyl chloride quaternary salt, (trimethylamino)ethyl methacrylate methyl chloride quaternary salt, (trimethylamino) ethyl methacrylate methyl sulfate quaternary salt, (trimethylamino)ethyl methacrylate benzyl chloride quaternary salt, (trimethylamino)ethyl methacrylate sulfuric acid salt, (trimethylamino)ethyl methacrylate hydrochloric acid salt, (trimethylamino)ethyl methacryloyl hydrochloric acid salt.

In one or more embodiments, the cationic friction reducer decomposes or degrades under certain downhole conditions (e.g., time, temperature, pH conditions, or a combination thereof) to form choline chloride or polyDADMAC as a degradation byproduct. In one or more embodiments, the cationic friction reducer degrades within hours (e.g., 0.5 to 5 hours, 0.75 to 3 hours, or 1 to 2 hours) after the cationic friction reducer is introduced into a formation. In one or more embodiments, the cationic friction reducer degrades at a minimum temperature of about 77° F. and at temperatures above 150° F., for example, 160° F., 170° F., or 180° F. In one or more embodiments, the cationic friction reducer degrades within hours (e.g., about 0.5-2 hours) at temperatures at or above 150° F. In one or more embodiments, the cationic friction reducer degrades at a pH lower than about 4 (e.g., 2, 3, or 3.5). In one or more embodiments, the cationic friction reducer degrades at a pH above about 8.5 or 9 (e.g., 9.5, 10, or 11).

In one or more embodiments, the cationic friction reducer is multi-functional. Initially, the cationic friction reducer functions as a friction reducer (e.g., during the fracturing operation when a friction reducer is needed the most), and at a later time (e.g., within an hour after the cationic friction reducer is introduced into the formation), the cationic friction reducer functions as a clay stabilizer. In one or more embodiments, the cationic friction reducer reduces energy losses due to friction in the wellbore servicing fluids. For example, the cationic friction reducer may reduce energy losses during introduction of the aqueous treatment fluid into a wellbore due to friction between the aqueous fluid in turbulent flow and the formation and/or tubular good(s) (e.g., a pipe, coiled tubing, etc.) disposed in the wellbore.

In one or more embodiments, after some time, the cationic friction reducer degrades according to the following equations to yield choline chloride or polyDADMAC (or DADMAC) as a degradation byproduct:

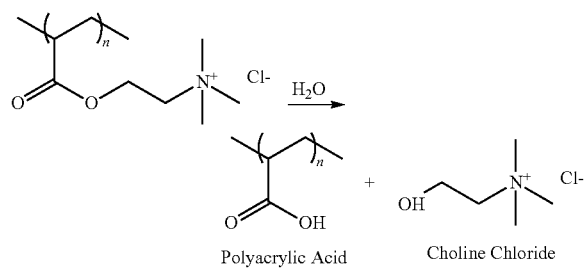

Polyacrylic Acid    Choline Chloride

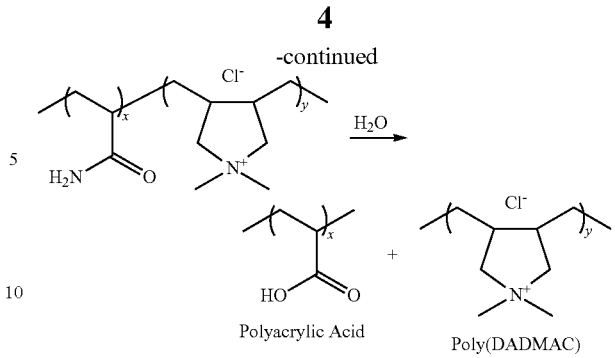

Polyacrylic Acid    Poly(DADMAC)

The recovery of fluids such as oil and gas from subterranean formations is troublesome in formations that contain water-sensitive minerals, e.g., water-swellable clays, such as clays in the smectite group, and fines capable of migrating when disturbed, such as silica, iron minerals, and alkaline earth metal carbonates. The terms "clays" and "water-sensitive clays" are used herein interchangeably to generally indicate water-sensitive clays that, when contacted by aqueous fluids in disequilibrium with the minerals in the formation, tend to swell and/or migrate. Thus, the use of aqueous fluids such as injection fluids, drilling muds, and stimulation fluids in such formations may be problematic as the resulting swelling and migration tends to block passageways to the wellbore, thereby causing a loss in permeability of the formation.

This loss in permeability impairs the flow of fluid through the wellbore and, in some cases may even completely block the flow of fluids through portions of the formation. Loss in permeability often leads to a decrease in the rate of recovery of the fluids from the well. Moreover, migrating clays can be produced with the formation fluids, thereby presenting abrasion and other problems with the production equipment.

Choline chloride and polyDADMAC each function to minimize the issues encountered with swelling and migrating clays. As further described below in the Examples, the cationic friction reducer lowers the capillary suction time (CST) and improves fines migration. Both the CST test and the turbidity test evaluate the efficacy of a clay stabilizing agent.

In one or more embodiments, degradation of the cationic friction reducer is triggered at an appropriate time by a combination of downhole conditions, including pH conditions and temperature. In one or more embodiments, the degradable bonds are bonds pertaining to the ester group in the cationic friction reducer. In one or more embodiments, the degradable bonds are carbon-carbon bonds that are broken due to extreme pH (e.g., a pH lower than about 4 or a pH above about 8.5) or elevated temperatures (e.g., 150° F. or higher).

In one or more embodiments, a treatment fluid that includes an anionic friction reducer is provided. In one or more embodiments, the anionic friction reducer includes a polyacrylamide copolymer. In one or more embodiments, the anionic friction reducer includes a block copolymer of polyacrylamide and 2-acrylamido-2-methylpropane sulfonic acid (AMPS). AMPS is also known as 2-acrylamido-tertbutylsulfonic acid (ATBS). In one or more embodiments, the anionic friction reducer includes poly(acrylamide-co-acrylic acid).

In one or more embodiments, the anionic friction reducer decomposes or degrades under certain downhole conditions to form AMPS or polyacrylic acid as a degradation byproduct. In one or more embodiments, the anionic friction reducer degrades within hours (e.g., 0.5 to 5 hours, 0.75 to 3 hours, or 1 to 2 hours) after the anionic friction reducer is introduced into a formation. In one or more embodiments, the anionic friction reducer degrades at temperatures above 120° F., for example, 120° F., 130° F., or 140° F. In one or more embodiments, the anionic friction reducer degrades within hours (e.g., about 0.5-2 hours) at temperatures at or above 120° F.

In one or more embodiments, the anionic friction reducer is multi-functional. Initially, the anionic friction reducer functions as a friction reducer and at a later time, in one or more embodiments, the anionic friction reducer functions as a surfactant (and additionally as a scale inhibitor, a paraffin inhibitor, and/or an asphaltene inhibitor). In one or more embodiments, the anionic friction reducer functions as a scale inhibitor at a later time. In one or more embodiments, the anionic friction reducer reduces energy losses due to friction in the wellbore servicing fluids. For example, the anionic friction reducer may reduce energy losses during introduction of the aqueous treatment fluid into a wellbore due to friction between the aqueous fluid in turbulent flow and the formation and/or tubular good(s) (e.g., a pipe, coiled tubing, etc.) disposed in the wellbore.

In one or more embodiments, the anionic friction reducer degrades over time according to the following equation to yield AMPS or ATBS as a degradation byproduct:

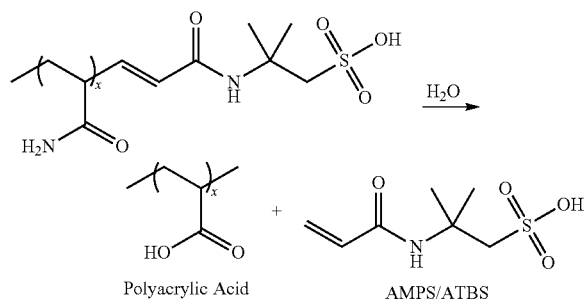

AMPS is a surfactant that can act as a scale inhibitor, a paraffin inhibitor, and/or an asphaltene inhibitor. Formation fluids include components that can precipitate and impede the production of oil and gas. These components include paraffins and asphaltenes from crude oil and gas condensates, and inorganic mineral scales from formation water. AMPS can prevent the formation of scales, paraffin deposits, and asphaltene precipitates in the formation and/or in the production lines downhole and at the surface.

In one or more embodiments, the anionic friction reducer degrades over time according to the following equation to yield polyacrylic acid as a degradation byproduct:

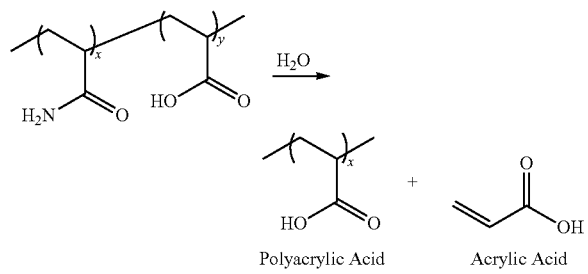

Polyacrylic acid functions as a scale inhibitor. As such, polyacrylic acid delays, reduces, and/or prevents scale deposition. Common oilfield scales include calcite ($CaCO_3$), barite ($BaSO_4$), and anhydrite ($CaSO_4$).

In one or more embodiments, the friction reducer may be provided in any suitable form, including in a solid form, as an oil-external emulsion polymer, or as a component of an aqueous solution.

In one or more embodiments, the friction reducer is added to a treatment fluid according to methods known to those of ordinary skill in the art. In one or more embodiments, the treatment fluid includes an aqueous fluid. Suitable aqueous fluids may include, for example, fresh water, salt water, seawater, brine (e.g., a saturated salt solution), or an aqueous salt solution (e.g., a non-saturated salt solution). Aqueous fluids can be obtained from any suitable source, provided that they do not contain an excess of compounds that may adversely affect the cationic friction reducer or the subterranean formation.

In one or more embodiments, the friction reducer is present in the treatment fluid in any amount sufficient to provide the desired level of friction reduction. In one or more embodiments, the friction reducer is present in an amount in the range of from about 0.0001 percent to about 1 percent by weight of the treatment fluid. For example, the friction reducer may be present in the treatment fluid in an amount of about 0.001 percent to about 1 percent by weight of the treatment fluid, about 0.01 percent to about 0.75 percent by weight of the treatment fluid, or about 0.1 percent to about 0.5 percent by weight of the treatment fluid.

In one or more embodiments, the treatment fluid further includes any number of additives that are commonly used in treatment fluids including, for example, surfactants, antioxidants, polymer degradation prevention additives, relative permeability modifiers, foaming agents, defoaming agents, antifoaming agents, emulsifying agents, de-emulsifying agents, proppants or other particulates, salts, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, and catalysts. Combinations of these additives can be used as well.

In one or more embodiments, the treatment fluid can be made to contact the subterranean formation by any suitable method that provides effective contact between the treatment fluid and the subterranean formation. The treatment fluid utilized can be used in conjunction with drilling, well injecting, gravel packing, fracturing or other operations performed on the subterranean formation. For example, the treatment fluid containing the friction reducer can be used in conjunction with drilling, stimulation, or completion operations to alleviate the damage otherwise caused by drilling, stimulation, or completion fluids.

In one or more embodiments, the friction reducer is used in hydraulic fracturing operations in a subterranean formation. In one or more embodiments, a treatment fluid including the friction reducer is pumped into a wellbore that penetrates a subterranean formation at a sufficient hydraulic pressure to create or enhance one or more cracks, or "fractures" in the subterranean formation. "Enhancing" one or more fractures in a subterranean formation, as that term is used herein, is defined to include the extension or enlargement of one or more natural or previously created fractures in the subterranean formation. In one or more embodiments, the treatment fluid may optionally include proppant particulates that may be deposited in the fractures. The proppant particulates may function to prevent one or more of the fractures from fully closing upon the release of hydraulic pressure, forming conductive channels through which fluids may flow to the well bore.

Advantageously, the friction reducer, on its own, can be used to treat a subterranean formation in a variety of ways. Traditionally, a combination of chemicals would be needed. For example, a fracturing fluid typically includes a friction reducer in combination with a clay stabilizer. In one or more embodiments, the friction reducer can be used to reduce friction and stabilize clays in a formation. In one more embodiments, the friction reducer can further be used as a surfactant, a scale inhibitor, a paraffin inhibitor, an asphaltene inhibitor, or any combination thereof.

In one or more embodiments, the friction reducer includes a cationic friction reducer, and the cationic friction reducer provides delayed release clay control. In one or more embodiments, over time, the cationic friction reducer degrades and releases choline chloride or polyDADMAC as a degradation byproduct. This slow release mechanism of the clay stabilizer allows for more effective placement and far field placement of the clay stabilizer.

In one or more embodiments, the cationic friction reducer releases choline chloride or polyDADMAC and consequently becomes neutrally charged under downhole conditions. As a result, the cationic friction reducer tends to have minimal interference with the original rock wettability and can act as a clay stabilizer after hydraulic fracturing.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide or some other type of fluid. In one or more embodiments, working fluid 54 includes a friction reducer.

Figure 2:
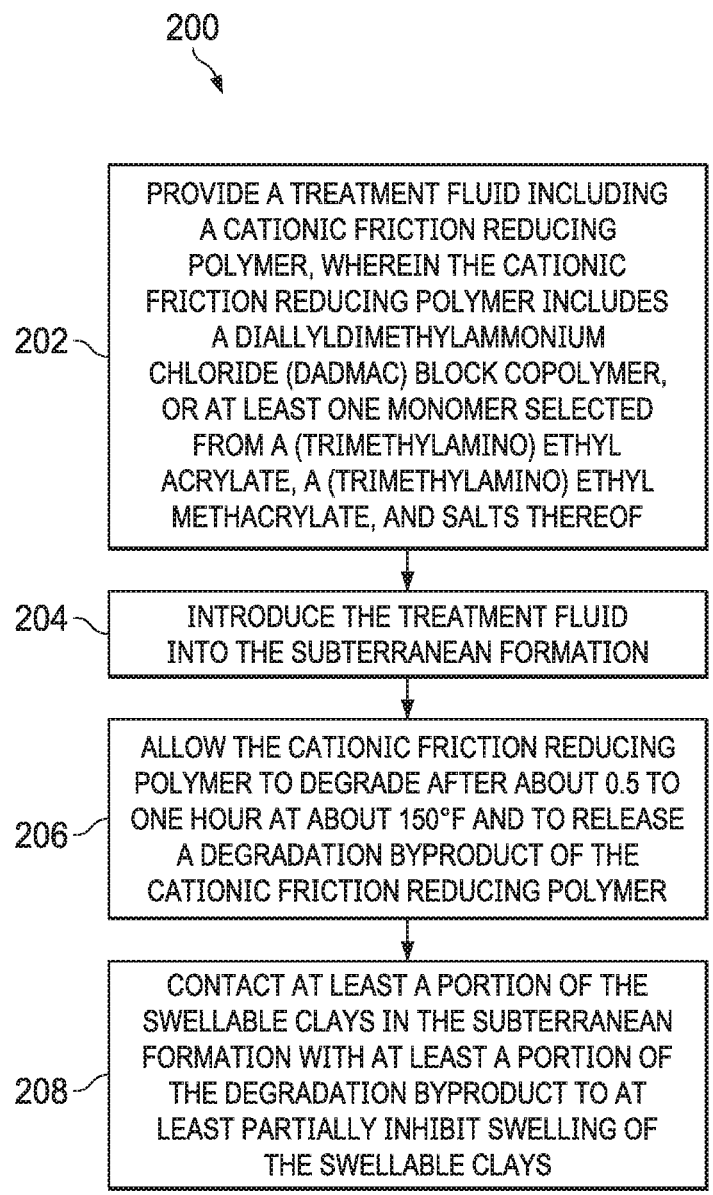
FIG. 2 depicts a method of treating a subterranean formation according to one or more embodiments.

According to one or more embodiments, a method of treating a subterranean formation that includes swellable clays is provided. Turning now to FIG. 2, the method 200 includes providing a treatment fluid that includes a cationic friction reducing polymer, wherein the cationic friction reducing polymer includes a DADMAC block copolymer or at least one monomer selected from a (trimethylamino)ethyl acrylate, a (trimethylamino)ethyl methacrylate, and salts thereof in step 202, introducing the treatment fluid into the subterranean formation in step 204, allowing the cationic friction reducing polymer to degrade after about 0.5 to 1 hour at 150 F and to release a degradation byproduct of the cationic friction reducing polymer in step 206, and contacting at least a portion of the swellable clays in the subterranean formation with at least a portion of the degradation byproduct to at least partially inhibit swelling of the swellable clays in step 208. The term "introducing," as used herein, includes pumping, injecting, pouring, releasing, dis-placing, spotting, circulating, or otherwise placing a fluid or material within a well, wellbore, or subterranean formation using any suitable manner known in the art.

Figure 3:
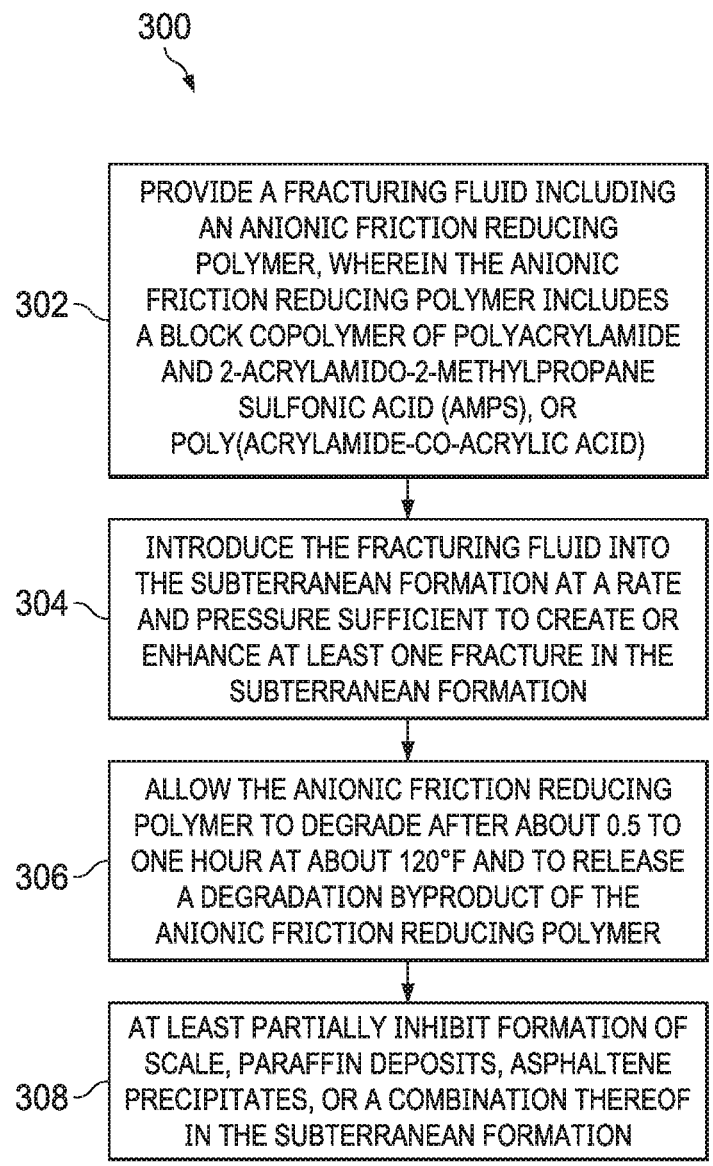
FIG. 3 depicts a method of hydraulically fracturing a subterranean formation according to one or more embodiments.

In one or more embodiments, a method of hydraulically fracturing a subterranean formation is provided. Turning now to FIG. 3, the method 300 includes providing a fracturing fluid that includes an anionic friction reducing polymer, wherein the anionic friction reducing polymer includes a block copolymer of polyacrylamide and 2-acrylamido-2-methylpropane sulfonic acid (AMPS), or poly(acrylamide-co-acrylic acid) in step 302, introducing the fracturing fluid into the subterranean formation at a rate and pressure sufficient to create or enhance at least one fracture in the subterranean formation in step 304, allowing the anionic friction reducing polymer to degrade after about 0.5 to 1 hour at about 120° F. and to release a degradation byproduct of the anionic friction reducing polymer in step 306, and at least partially inhibiting formation of scale, paraffin deposits, asphaltene precipitates, or a combination thereof in the subterranean formation in step 308.

Figure 4:
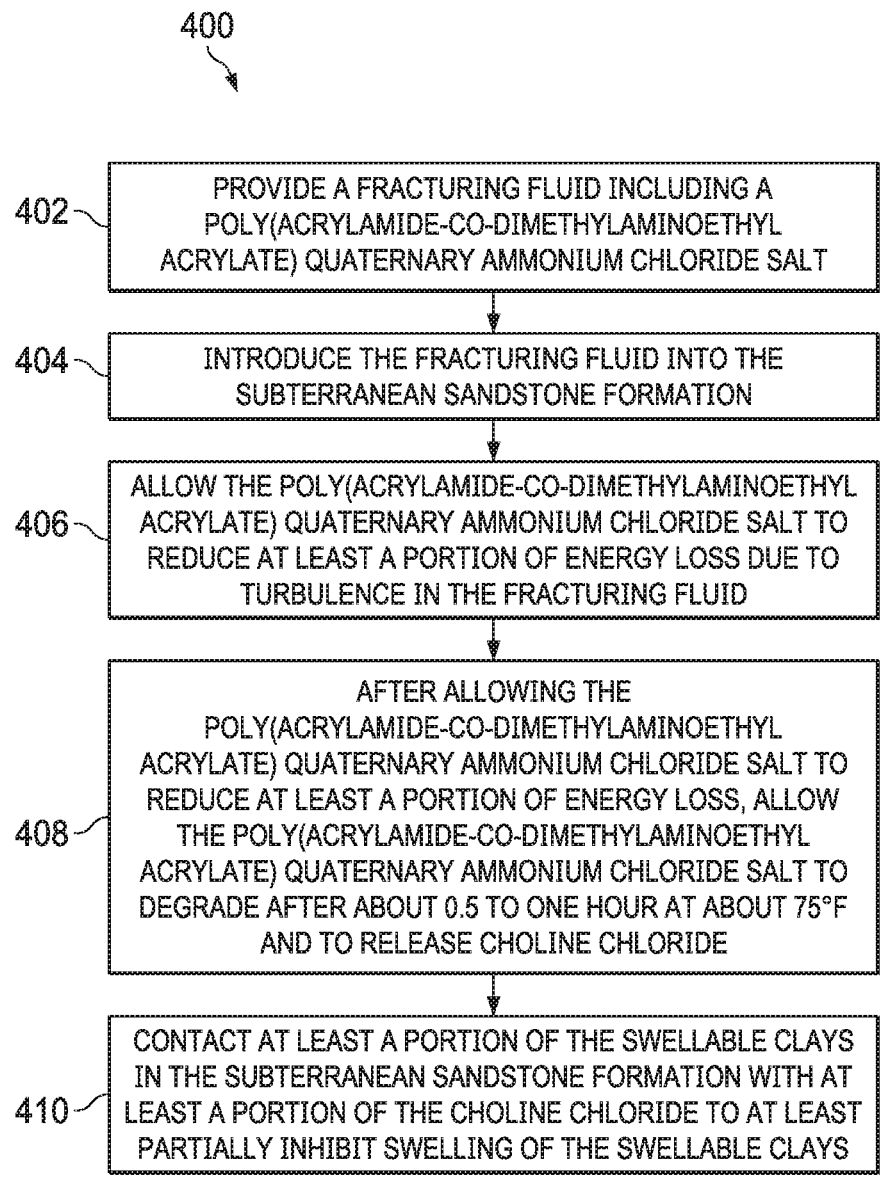
FIG. 4 depicts a method of reducing friction in a treatment fluid and stabilizing swellable clays in a subterranean formation according to one or more embodiments.

In one or more embodiments, a method of reducing friction in a fracturing fluid and stabilizing swellable clays in a subterranean sandstone formation is provided. Turning now to FIG. 4, the method 400 includes providing a fracturing fluid that a poly(acrylamide-co-dimethylaminoethyl acrylate) quaternary ammonium chloride salt in step 402, introducing the fracturing fluid into the subterranean sandstone formation in step 404, allowing the poly(acrylamide-co-dimethylaminoethyl acrylate) quaternary ammonium chloride salt to reduce at least a portion of energy loss due to turbulence in the fracturing fluid in step 406, after allowing the poly(acrylamide-co-dimethylaminoethyl acrylate) quaternary ammonium chloride salt to reduce at least a portion of energy loss, allowing the poly(acrylamide-co-dimethylaminoethyl acrylate) quaternary ammonium chloride salt to degrade after about 0.5 to 1 hour at about 75° F. and to release choline chloride in step 408, and contacting at least a portion of the swellable clays in the subterranean sandstone formation with at least a portion of the choline chloride to at least partially inhibit swelling of the swellable clays in step 410.

Thus, a method of treating a subterranean formation that includes swellable clays is provided. Embodiments of the method may generally include providing a treatment fluid that includes a cationic friction reducing polymer, wherein the cationic friction reducing polymer includes a diallyldimethylammonium chloride (DADMAC) block copolymer, or at least one monomer selected from a (trimethylamino)ethyl acrylate, a (trimethylamino)ethyl methacrylate, and salts thereof; introducing the treatment fluid into the subterranean formation; allowing the cationic friction reducing polymer to degrade after about 0.5 to 1 hour and release a degradation byproduct of the cationic friction reducing polymer; and contacting at least a portion of the swellable clays in the subterranean formation with at least a portion of the degradation byproduct to at least partially inhibit swelling of the swellable clays. For any of the foregoing embodiments, the method may include any one of the following, alone or in combination with each other.

In one or more embodiments, the method further includes subjecting the cationic friction reducing polymer to a temperature of above 150° F. for at least 2 hours to facilitate the release of the degradation byproduct. In one or more embodiments, the method further includes subjecting the cationic friction reducing polymer to a pH below about 4 or a pH above about 8.5 to facilitate the release of the degradation byproduct.

In one or more embodiments, the subterranean formation includes sandstone.

In one or more embodiments, the treatment fluid includes a fracturing fluid. In one or more embodiments, the fracturing fluid includes water. In one or more embodiments, the water includes fresh water, salt water, or mixtures thereof.

In one or more embodiments, the treatment fluid includes from about 0.001 percent to about 1 percent of the cationic friction reducing polymer by weight of the treatment fluid.

In one or more embodiments, the DADMAC block copolymer includes poly(DADMAC-co-acrylamide), or the (trimethylamino)ethyl acrylate or the (trimethylamino)ethyl methacrylate are selected from (trimethylamino)ethyl acrylate methyl chloride quaternary salt, (trimethylamino)ethyl acrylate methyl sulfate quaternary salt, (trimethylamino) ethyl acrylate benzyl chloride quaternary salt, (trimethylamino)ethyl acrylate sulfuric acid salt, (trimethylamino) ethyl acrylate hydrochloric acid salt, (triethylamino)ethyl acrylate methyl chloride quaternary salt, (trimethylamino) ethyl methacrylate methyl chloride quaternary salt, (trimethylamino) ethyl methacrylate methyl sulfate quaternary salt, (trimethylamino)ethyl methacrylate benzyl chloride quaternary salt, (trimethylamino)ethyl methacrylate sulfuric acid salt, (trimethylamino)ethyl methacrylate hydrochloric acid salt, (trimethylamino)ethyl methacryloyl hydrochloric acid salt, and combinations thereof.

A method of hydraulically fracturing a subterranean formation is also provided. The method includes providing a fracturing fluid including an anionic friction reducing polymer, wherein the anionic friction reducing polymer includes a block copolymer of polyacrylamide and 2-acrylamido-2-methylpropane sulfonic acid (AMPS), or poly(acrylamide-co-acrylic acid); introducing the fracturing fluid into the subterranean formation at a rate and pressure sufficient to create or enhance at least one fracture in the subterranean formation; allowing the anionic friction reducing polymer to degrade after about 0.5 to 1 hour at about 120° F. and to release a degradation byproduct of the anionic friction reducing polymer; and at least partially inhibiting formation of scale, paraffin deposits, asphaltene precipitates, or a combination thereof in the subterranean formation. For any of the foregoing embodiments, the method may include any one of the following, alone or in combination with each other.

In one or more embodiments, the method further includes subjecting the anionic friction reducing polymer to a temperature of above 120° F. for at least 2 hours to facilitate the release of the degradation byproduct.

In one or more embodiments, the method further includes subjecting the anionic friction reducing polymer to a temperature of above 130° F. for at least 3 hours.

In one or more embodiments, the fracturing fluid further includes water. In one or more embodiments, the water includes fresh water, salt water, or mixtures thereof.

In one or more embodiments, the fracturing fluid includes from about 0.001 percent to about 1 percent of the anionic friction reducing polymer by weight of the treatment fluid.

In one or more embodiments, the fracturing fluid further includes proppant particulates.

A method of reducing friction in a fracturing fluid and stabilizing swellable clays in a subterranean sandstone formation is also provided. The method includes providing a fracturing fluid including a poly(acrylamide-co-dimethylaminoethyl acrylate) quaternary ammonium chloride salt; introducing the fracturing fluid into the subterranean sandstone formation; allowing the poly(acrylamide-co-dimethylaminoethyl acrylate) quaternary ammonium chloride salt to reduce at least a portion of energy loss due to turbulence in the fracturing fluid; after allowing the poly(acrylamide-co-dimethylaminoethyl acrylate) quaternary ammonium chloride salt to reduce at least a portion of energy loss, allowing the poly(acrylamide-co-dimethylaminoethyl acrylate) quaternary ammonium chloride salt to degrade after about 0.5 to 1 hour at about 75° F. and to release choline chloride; and contacting at least a portion of the swellable clays in the subterranean sandstone formation with at least a portion of the choline chloride to at least partially inhibit swelling of the swellable clays. For any of the foregoing embodiments, the method may include any one of the following, alone or in combination with each other.

In one or more embodiments, the method further includes subjecting the poly(acrylamide-co-dimethylaminoethyl acrylate) quaternary ammonium chloride salt to a temperature of about 150° F. to facilitate the release of the choline chloride.

In one or more embodiments, the fracturing fluid includes from about 0.001 percent to about 1 percent of the poly(acrylamide-co-dimethylaminoethyl acrylate) quaternary ammonium chloride salt by weight of the fracturing fluid.

In one or more embodiments, the fracturing fluid further includes water. In one or more embodiments, the water includes fresh water, salt water, or mixtures thereof.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The following examples are illustrative of the compositions and methods discussed above and are not intended to be limiting.

Example 1

Capillary Suction Time (CST) Test

The CST test measures the swelling tendency of formation materials in the presence of a treatment fluid. A slurry of formation materials and treatment fluid is generated, and the time required for the free liquid to travel a calibrated distance in a standard porous paper is measured. The measurement is made by placing a certain volume of slurry into a sample cylinder that is resting on a standard porous paper. Electrodes located at two different distances from the edge of the cylinder are connected with a timer. The timer starts when liquid reaches the closest electrode and then stops when it reaches the outer electrode. The time interval measured is sensitive to the amount of free water in the slurry and the permeability of the filter cake deposited. As the formation material swells, it takes up free water from the slurry, which decreases available water to wick through the filter paper. Therefore, the lower the CST, the less the formation materials swell in that treatment fluid.

The average time interval will be lower for fluids that minimize clay swelling and particle dispersion. Water and other damaging fluid systems are likely to have longer CSTs.

Prior to testing, cleaned core formation samples were crushed to +120 mesh for the CST testing. A poly(acrylamide-co-dimethylaminoethyl acrylate) quaternary ammonium chloride salt at a concentration of 1 gal/Mgal in produced water was broken by heating overnight at 150° F. For comparison, deionized (DI) water, a solution of 7% KCl prepared with produced water, and a sample of produced water was also tested.

The CST results for crushed cores in the four solutions are shown in FIG. 5. The cuttings sample had very low swelling tendency in DI water without any clay control treatment. Overall, the slurry with the cuttings sample in produced water, KCl with produced water and broken poly(acrylamide-co-dimethylaminoethyl acrylate) with produced water had shorter CST than in DI water, indicating a reduced potential for clay swelling for the cores to some extent. However, all three solutions had similar performance on reducing clay swelling tendency.

Example 2

Turbidity Test

When the fines generation number is higher than 200 Nephelometric Turbidity Units (NTU), fines generation damage can occur. It has been shown that high mechanical damages result with a fines generation number of 903 NTU in DI water without any treatment.

Clean core formation samples were crushed to 30/40 mesh prior to testing. The same fluids: DI water, produced water, 7% KCl in produced water, and 1 gal/Mgal broken poly(acrylamide-co-dimethylaminoethyl acrylate) quaternary ammonium chloride salt in produced water, were used for this testing. In this test the opacity of solutions containing crushed core samples were measured over time with mixing. Samples with more fines migration over time become more opaque than those that are stabilized. The results of the fines generation during the turbidity test and the improvement with the chemicals can be seen in FIGS. 6 and 7. The turbidity results indicated a slight improvement in fines migration with the poly(acrylamide-co-dimethylaminoethyl acrylate) quaternary ammonium chloride salt. Fines migration damage was still observed with the addition of 7% KCl and the poly(acrylamide-co-dimethylaminoethyl acrylate) quaternary ammonium chloride salt in produced water, although the fines generation number was reduced with these chemicals. Addition of 7% KCl led to a lower fines generation than the poly(acrylamide-co-dimethylaminoethyl acrylate) quaternary ammonium chloride salt.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation comprising swellable clays, comprising:
   providing a treatment fluid comprising a cationic friction reducing polymer, wherein the cationic friction reducing polymer comprises:
      a diallyldimethylammonium chloride (DADMAC) block copolymer, or
      at least one monomer selected from a (trimethylamino)ethyl acrylate, a (trimethylamino)ethyl methacrylate, and salts thereof;
   introducing the treatment fluid into the subterranean formation;
   allowing the cationic friction reducing polymer to degrade after about 0.5 to 1 hour at about 150° F. and release a degradation byproduct of the cationic friction reducing polymer; and
   contacting at least a portion of the swellable clays in the subterranean formation with at least a portion of the degradation byproduct to at least partially inhibit swelling of the swellable clays.

2. The method of claim 1, further comprising subjecting the cationic friction reducing polymer to a temperature of above 150° F. for at least 2 hours to facilitate release of the degradation byproduct.

3. The method of claim 1, wherein the subterranean formation further comprises sandstone.

4. The method of claim 1, wherein the treatment fluid comprises a fracturing fluid.

5. The method of claim 4, wherein the fracturing fluid comprises water.

6. The method of claim 5, wherein the water comprises fresh water, salt water, or mixtures thereof.

7. The method of claim 1, wherein the treatment fluid comprises from about 0.001 percent to about 1 percent of the cationic friction reducing polymer by weight of the treatment fluid.

8. The method of claim 1, wherein the DADMAC block copolymer comprises poly(DADMAC-co-acrylamide), or the (trimethylamino)ethyl acrylate or the (trimethylamino)ethyl methacrylate are selected from (trimethylamino)ethyl acrylate methyl chloride quaternary salt, (trimethylamino)ethyl acrylate methyl sulfate quaternary salt, (trimethylamino)ethyl acrylate benzyl chloride quaternary salt, (trimethylamino)ethyl acrylate sulfuric acid salt, (trimethylamino)ethyl acrylate hydrochloric acid salt, (triethylamino)ethyl acrylate methyl chloride quaternary salt, (trimethylamino)ethyl methacrylate methyl chloride quaternary salt, (trimethylamino) ethyl methacrylate methyl sulfate quaternary salt, (trimethylamino)ethyl methacrylate benzyl chloride quaternary salt, (trimethylamino)ethyl methacrylate sulfuric acid salt, (trimethylamino)ethyl methacrylate hydrochloric acid salt, (trimethylamino)ethyl methacryloyl hydrochloric acid salt, and combinations thereof.

* * * * *